April 6, 1971 W. A. AYRES 3,573,891
METHOD OF FORMING A THERMOMETER CONSTRICTION
AND APPARATUS THEREFOR
Filed April 1, 1968 4 Sheets-Sheet 1
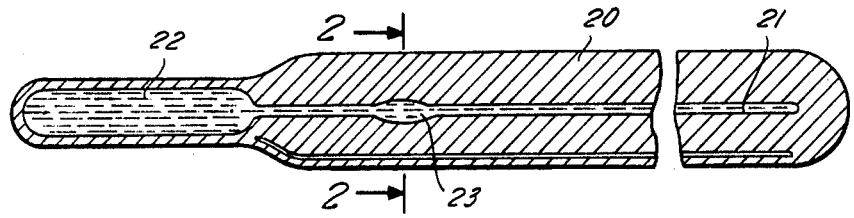
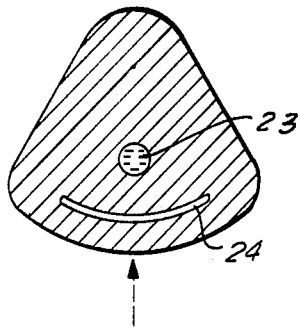
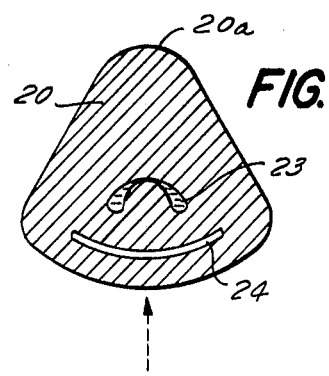
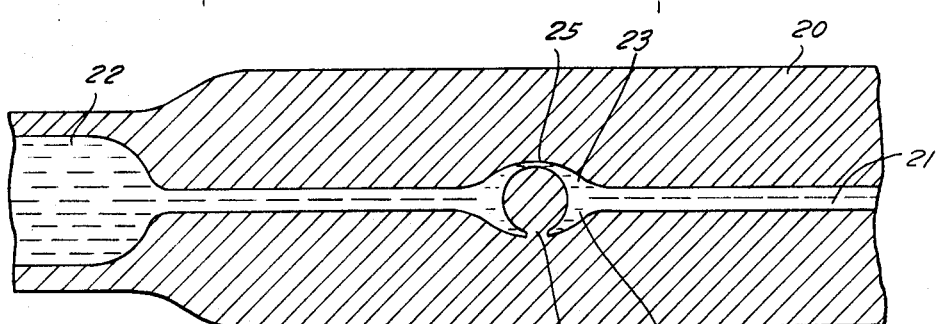
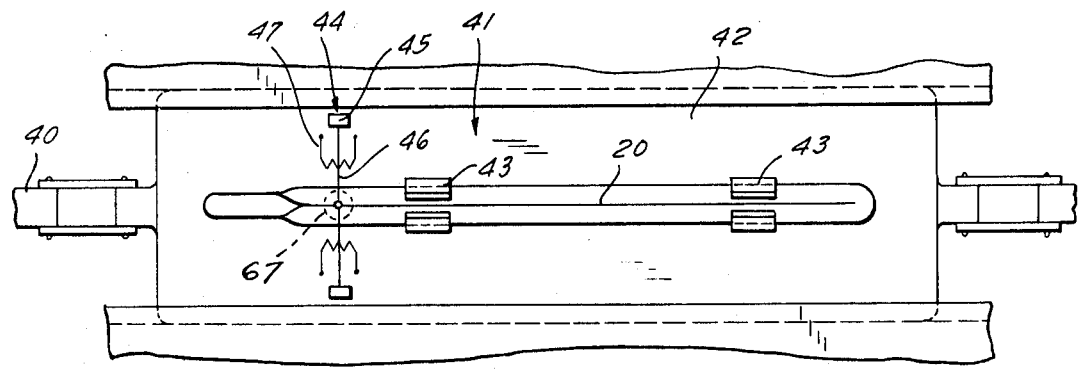
INVENTOR
WALDEMAR A. AYRES
BY
Kane, Dalsimer, Kane, Sullivan & Smith
ATTORNEYS April 6, 1971 W. A. AYRES 3,573,891
METHOD OF FORMING A THERMOMETER CONSTRICTION
AND APPARATUS THEREFOR
Filed April 1, 1968 4 Sheets-Sheet 3

INVENTOR
WALDEMAR A. AYRES
BY
Kane, Dalsimer, Kane, Sullivan & Smith
ATTORNEYS

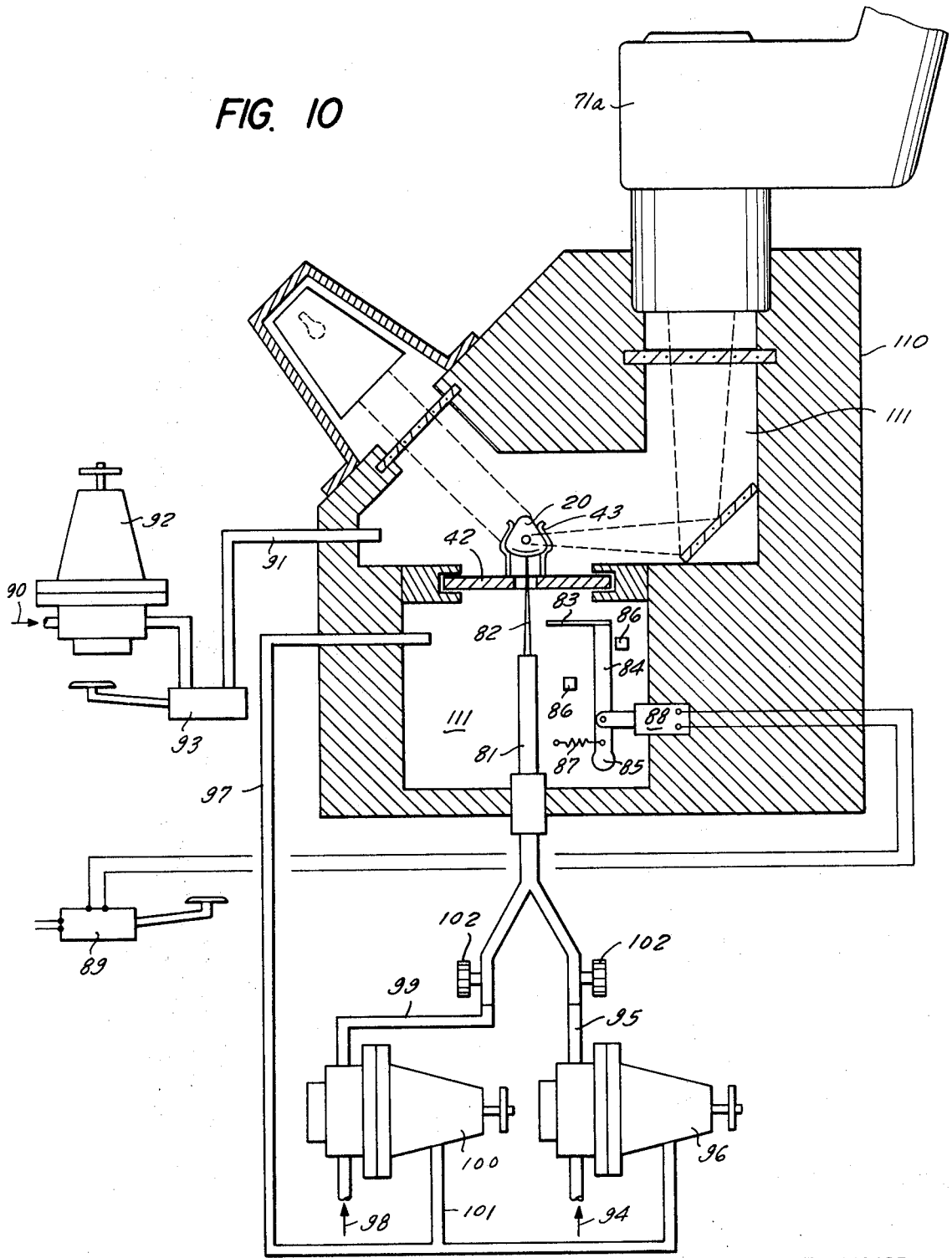

United States Patent Office 3,573,891
Patented Apr. 6, 1971

3,573,891
METHOD OF FORMING A THERMOMETER CONSTRICTION AND APPARATUS THEREFOR
Waldemar A. Ayres, Rutherford, N.J., assignor to Becton, Dickinson and Company, East Rutherford, N.J.
Filed Apr. 1, 1968, Ser. No. 717,821
Int. Cl. C03b 23/10
U.S. Cl. 65—110                                              10 Claims

ABSTRACT OF THE DISCLOSURE

A method and apparatus for collapsing the bubble in the bore of a thermomenter blank to form a constriction therein in the manufacture of clinical thermometers. The thermometer is positioned within a pressurized chamber and is subjected to localized heating by means of a heat source such as a gas burner or a laser, at the location of the bubble. Control means are provided to regulate the length of time the bubble is subjected to heat thereby providing a method of regulating the amount of collapse of the bubble in forming the constriction. The air pressure is regulated which provides additional control over the speed of collapse of the bubble and sudden decompression is used to stop the collapse at the proper moment. Holding means and control means are also provided for properly positioning a thermometer blank in alignment with the heat source. The result is a considerable improvement in the percentage of acceptable constrictions and a reduction of factory costs in the manufacture of clinical thermometers.

BACKGROUND OF THE INVENTION

In the art of manufacturing clinical thermometers and particularly in the formation of an acceptable constriction, very high skill in specialized glass blowing techniques is required for collapsing the constriction cavity in the bore of the thermometer blank. The normal diameter of the capillary within a thermometer blank is generally in thousandths of an inch whereas the minimum diameter of an acceptable constriction must be in the order of one-one hundred thousandths of an inch. The collapsed portion must also have a special shape to act as an anchor for the mercury above the constriction so that the mercury will not run downhill or "slide off" if the thermometer is inverted or tipped downward. Furthermore, the constriction configuration has to be so shaped and dimensioned that each thermometer comes within specifications for shake down or centrifuging. This relates to the ease with which the mercury may be shaken down from above the constriction into the bulb after use preparatory to a further use.

In general present day techniques gas flames are used, however, exceptional skill is required on the part of the operator in order to stop the collapse of the bubble at the proper moment. Approximately three to six months of special training and practice is ordinarily required before an operator can work proficiently in regular production of constriction formation. This is due to the fact that when collapsing the bubble with a gas flame, it proceeds rapidly and has to be stopped at the precise moment. Otherwise if permitted to proceed too far, the constriction is rejectable or required to be reworked.

From experience, the operator can generally tell by the shape and size of the bubble as it is collapsing when to cut off the heat source.

The principle problems encountered by the operator appear to include the following: the difficulty of aligning the nearly invisible blue flame properly with the workpiece, the difficulty of adequately seeing the tiny bubble to be collapsed, and the necessity of cutting off the heat source at just the right moment to get the shape desired.

Rejected thermometers are generally those in which the thermometer is too hard or too easy a "shaker," or the shape of the constriction is improper so that the thermometer is a reject due to "slide off" of the mercury, or the capillary is completely closed off.

The prime factor causing the above difficulties appears to be the rate of speed at which a bubble collapses and the corresponding high skill necessary to cut-off the heat source at just the right moment.

In present practice, after the operator has cut off the supply, the heated glass continues to collapse at the bubble for a period of time thereafter, therefore the operator has to estimate when to cut off the heat supply so that the glass will not stop collapsing too quickly and will not collapse too far which cause a problem called "overshoot." In the case of a bubble which has not collapsed far enough to form a constriction, it will not hold a maximum reading according to standard, would be considered too easy a "shaker" and would be rejected. In the case of a bubble collapsed too far, the bubble is collapsed so far that the passage is almost or completely closed off, once again becoming a reject either because it is too hard a "shaker" or it will not function at all due to the lack of a continuous bore in the thermometer blank.

Therefore, it would be a significant achievement in the art if the collapse of the bubble could be more closely controlled in regard to the speed at which it is stopped after the heat is removed. In this manner the problem of "overshoot" can be greatly reduced because of better operator control and, consequently, the number of rejects of this type would be reduced. In short, it would certainly be advantageous to employ controllable heating means and minimize human error in the formation of a thermometer constriction.

SUMMARY OF THE INVENTION

It is, therefore, a primary objective of the invention to provide an apparatus and method for forming the constriction in a thermometer blank in which a greater amount of control is possible over the rate of collapse of the bubble within the thermometer blank thereby reducing the production costs and the high degree of operator skill required on the production line.

It has been found that the atmospheric pressure on the outside of a thermometer under normal atmospheric conditions relative to the usually much lower mercury vapor pressure on the inside collapses the cavity when the glass is heated and softened enough to be pushed in by this differential pressure. Therefore, an additional element of control in the form of a quicker positive stopping of the collapse after the heating means has been removed can be provided by manipulating the outside gas pressure on the thermometer by placing the thermometer within a controlled atmospheric pressure chamber during heating, thereby alleviating the problem of "overshoot." "Overshoot," as previously stated, is the continuation of collapse of the bubble after the operator has cut off the heat.

In addition to the provision of this controlled pressure chamber during collapsing of the bubble, a more controllable heat source may be used with or without the controlled pressure chamber. For example, a laser which may be adapted for this type of work may be used.

Basically the apparatus includes a supporting structure with a thermometer holding means mounted on the supporting structure. A laser is then positioned in relation to the supporting structure and the thermometer holding means so the heat from the laser impinges on the thermometer blank and collapses the bubble to form the constriction.

Additionally, control means is associated with the support and the laser for moving the thermometer blank into alignment with the laser so that heat impinges on and collapses the bubble in the thermometer blank and for removing the heat when the bubble has been collapsed sufficiently to form an adequate constriction in the bore of the thermometer blank.

An enclosure is provided to house the thermometer blank and holding means within a controlled atmospheric pressure chamber. The enclosure includes means for allowing the laser or another type of heat source such as a common type of gas burner to impinge upon the thermometer blank and collapse the bubble. Manual controls are provided to allow the operator to adjust the air pressure within the housing to regulate the rate and more rapidly stop the collapse. Part of the enclosure is transparent for watching the thermometer by microscope means during operation. In use, increased gas pressure collapses the cavity at a lower glass temperature due to the increased difference in the outside pressure and the mercury pressure within the bubble or cavity. If the outside pressure is suddenly and greatly reduced, and the heat source is removed at the same time the collapsing of the bubble is stopped quickly thereby giving greater control and alleviating the problem of guessing how much "overshoot" to allow for. Additionally, when the collapsing of the bubble has proceeded too far, it can be reversed by reducing the gas pressure to partial vacuum. This provides a correcting ability in that bubbles which have been collapsed too far to provide acceptable constrictions can be expanded slightly and in this manner becomes acceptable.

When using this type of enclosure with the gas burner, a remotely controlled electromagnetic flag is provided to cut off the flame from reaching the thermometer and is connected to the control system. The transparent portions of the enclosure enable illumination of the thermometer and projection of an enlarged image to be watched by the operator while controlling the flag and the enclosed gas pressure during operation.

A compressed air supply is connected to the enclosure to provide a source of air and, additionally a combustible gas supply having a pressure substantially higher than the pressure to be used within the enclosure is provided. An air or oxygen supply to be used as the oxidizer for the combustible gas is also connected to the gas burner within the enclosure. This gas generally is provided at a pressure substantially higher than the pressure to be used in the chamber.

A protective type of shield or hood is provided when a laser is used as the heat source to protect the operator and other persons from the laser ray or any reflection thereof. The hood has entrance means and an exit means for placing the thermometer into the hooded area and removing the same after the operation is complete. A representative access means includes, for example, a reciprocally movable gate driven by drive means and an attached pinion and rack arrangement including sealing means to retain pressurized gas. The gate is also adapted to prevent any parts of the laser beam from escaping from under the hood. The operation of the movable gate is interconnected with the control means of the system so that it can be controlled by the operator.

The means for holding the thermometer includes, for example, a platform having aligned clips extending upwardly therefrom in which to mount the thermometer blank. Additionally auxiliary heating means, such as an electric heating element, is mounted on the holding platform and positioned adjacent the constriction. This auxiliary heating means pre-heats the thermometer before it comes in contact with the heat source and also is used to post-heat the thermometer for annealing purposes after the heat source has been deactivated. Furthermore, an indexing means is positioned on the holder to aid in properly positioning the thermometer on the holder so that it will be aligned with the heat source when placing in position for operation. The supporting structure includes two parallel spaced channels which form a track in which the platform is slidably positioned. Drive means, such as a chain conveyor, is connected to each platform so that a continuous train of platforms each holding a thermometer blank is provided to be aligned with the laser.

With portions of the enclosure being transparent, additional lighting means may be directed on the thermometer blank from the outside of the enclosure and also magnifying means is directed through a transparent portion of the enclosure to allow the operator to more clearly observe the bubble within the thermometer blank as it is being collapsed.

This apparatus and method are provided for controlling the rate of collapse of a bubble within a thermometer blank to form the constriction within a clinical thermometer thereby reducing the costs and the high degree of special skills required to mass produce clinical thermometers while at the same time increasing the yield of acceptable constrictions and reducing the percentage of rejects.

BRIEF DESCRIPTION OF THE DRAWINGS

With the above and other objects in mind, reference is made to the attached drawings embodying the invention, in which:

FIG. 1 is a sectional side view of a thermometer blank shown prior to the formation of a constriction therein and with a portion thereof broken away and removed;

FIG. 2 is a sectional end view thereof taken along the plane of line 2—2 of FIG. 1;

FIG. 3 is a sectional end view of thermometer shown in FIG. 2 after the constriction having two passages has been formed by application of heat in the direction shown by the arrow;

FIG. 4 is a partial sectional top view of a thermometer blank after a constriction having one passage has been formed;

FIG. 5 is a partial top plan view of the thermometer holding portion of the invention with a thermometer blank shown in position;

FIG. 10 is a fragmentary sectional elevation view of the apparatus of the invention with a gas burner being used as the heat source.

DESCRIPTION OF THE PREFERRED EMBODIMENT

Figure 6:
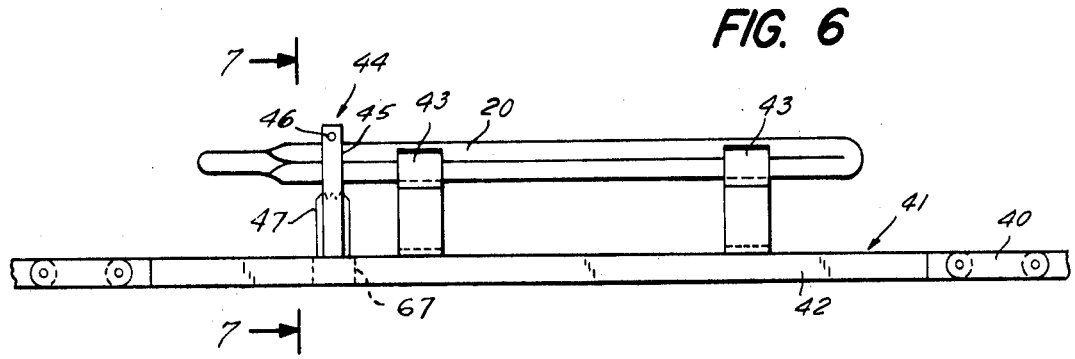
FIG. 6 is a side elevation view thereof.

In the process of manufacturing clinical thermometers, one of the most important steps is the formation of the constriction in the bore of the thermometer blank. As discussed above, a proper constriction is difficult to form and yet it is absolutely necessary in order to manufacture an acceptable clinical theremometer.

The condition of the thermometer blank when it is ready for formation of the constriction can be seen in FIGS. 1 and 2. The thermometer blank 20 contains a tiny bore 21 therein. This bore 21 is connected at one end to a bulb portion 22 of the thermometer blank which contains mercury. Bore 21 is a flattened oval approximately 0.003 inch across its major axis. Therefore, it is obvious that in FIGS. 1 and 2 the size of this bore is exaggerated. In bore 21, at this point in the manufacturing process, a bubble 23 is positioned in bore 21 near bulb 22. This bubble 23 is of a slightly larger diameter than bore 21 and is formed during glass blowing operations. Theromometer blank 20 also contains a white reflecting background portion 24 positioned so that bore 21 is between white portion 24 and the lens part 20a of thermometer blank 20 to facilitate the viewing of the position of the mercury within bore 21. The white background portion 24 is positioned therein during formation of the thermometer blank by well known methods.

When a constriction is formed, heat is applied to the thermometer blank 20 near or at the position of bubble 23 at the back. The heat causes the thermometer blank 20 to soften at this point with the result that air pressure being generally greater than the mercury vapor pressure within the bore of thermometer blank 20 will cause bubble 23 to collapse. The heat is removed at precisely the right moment to stop the collapsing of bubble 23 before it completely closes which would cause a discontinuation of bore 21 and an unacceptable thermometer. The critical time during collapse in known procedures is generally less than one second. Therefore, it takes a highly skilled operator to know and determine the exact moment to cut off the heat. From experience, he can generally tell from the size and shape of the bubble when a proper constriction should be present.

In FIGS. 3 and 4, bubble 23 can be observed after it has been collapsed to form a proper and acceptable construction. It can be seen how bubble 23 takes a particular shape after collapse. A narrow passage 25 is formed so that the passage of mercury will be restricted but not entirely stopped. Often it is acceptable to have a restricted passage 25 on both sides of the collapsed bubble, an example of which can be seen in FIG. 3. The construction shown in FIG. 4 shows only one passage 25 with the other possible passage 26 being completely closed off.

A properly formed constriction must serve several purposes. Once the mercury has been driven above the constriction by heating, the constriction must be able to retain all of the mercury above the constriction point when the heat is removed. This must be true no matter how the thermometer is held by the user. Additionally, it must not be too hard or too easy to shake the mercury down through the constriction into the bulb after use and prior to reuse. Furthermore, the upper well 27 must be of a proper shape and configuration so that "slide off" does not occur. "Slide off" refers to the mercury moving to a higher temperature reading when the thermometer is held horizontally or is tipped downwardly as compared with the temperature reading when the thermometer is held in a vertically upright position.

From the foregoing discussion of criteria necessary for an acceptable constriction it is obvious that there are extremely small tolerances in regard to the formation of a constriction and with present day techniques high operator skill is required to form a proper constriction. What happens is that human error results in a large percentage or reworks or rejections.

The prime factor in this difficulty appears to lie in the rate at which the bubble collapses and therefore the corresponding high skill necessary to cut-off the heat source at just the right moment. Therefore, this invention provides heating means for controlling the rate of collapse of the bubble and means for markedly improving the controlled stopping of the heating prior to the ending of collapse (problem of "overshoot"), thus reducing production costs by reducing the operator skill necessary and decreasing the number of "reworks" and "rejects."

Figure 7:
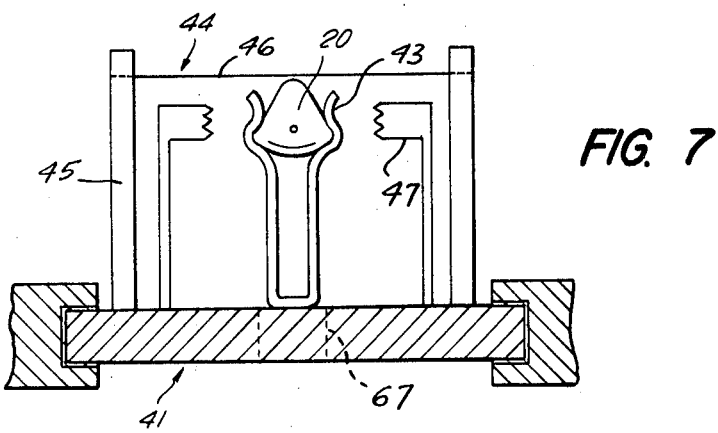
FIG. 7 is a sectional end view thereof taken along the plane of line 7—7 of FIG. 6.

The apparatus in general includes a supporting structure 30 (see FIGS. 8 and 10) and an operating position where the operator would be located to control the formation of the construction. Holding means are provided for holding the thermometer blank while the constriction is being formed and conveying means are also provided to locate each thermometer holding means in a proper position for formation of the constriction. The holding means and conveying means are shown in FIGS. 5–7. The conveying means may be any generally well known type of conveying mechanism such as a chain conveyor 40 which is shown in the drawings. Chain conveyor 40 is connected to the holding means 41. Holding means 41 includes a base or platform 42 which is substantially rectangular in configuration. Mounted on platform 42 in an upright position are a pair of clips 43 which are aligned so as to hold a thermometer blank 20 in a longitudinally fixed position with respect to platform 42.

Also positioned on the holding means in an index reference means 44 which is located so as to enable proper alignment of the bubble in thermometer blank 20 with the heat source, a laser, prior to when the constriction operation is performed. A representative type of index reference means is such as that shown in the drawing includes two upstanding posts 45 and a wire 46 extending between posts 45 and connected to the tops thereof. Link chain conveyor 40 is set up to carry a continuous chain of thermometer holding means with each one being properly spaced so that they are indexed under control of an operator foot switch, for instance, to index and stop at a work station in proper sequence. The thermometers may be hand loaded onto thermometer holding means 41.

An additional element on the thermometer holding means 41 is the provision of a heating element to heat the thermometer at the vicinity of the bubble both before and after heat treatment to prevent cracking. As shown in the drawings, a small radiant electrical type of heater 47 is mounted on platform 42 on either side of the bubble portion of the thermometer to accomplish the heating step. Many other types of common heating means may be employed for this purpose such as radiant heat, gas heat or super-heated air.

Chain conveyor 40 is connected to the supporting structure 30 (see FIG. 8) and aligned so that chain conveyor 40 will pass through an opening in a hood or enclosure 50 into working area or controlled atmospheric chamber 51. This hood is located at the working station where the operator is located to perform the constriction operation.

Figure 9:
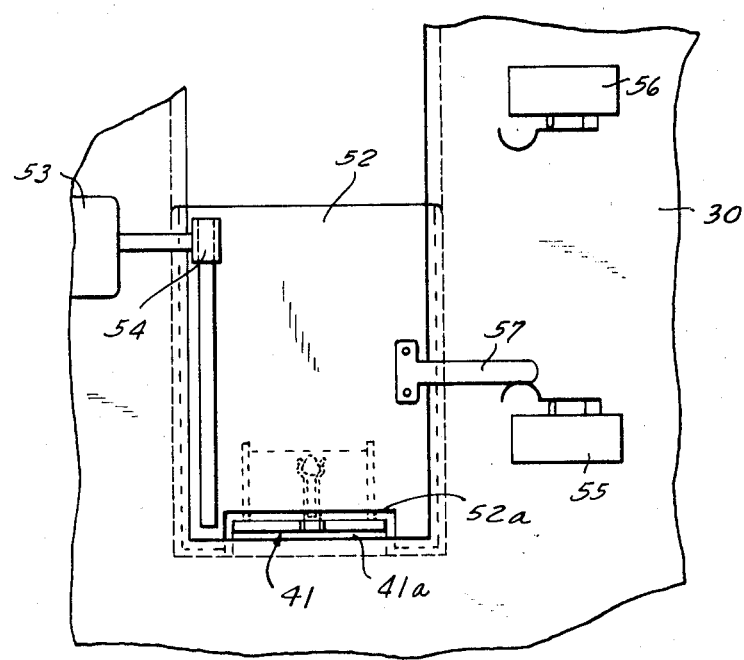
FIG. 9 is a fragmentary elevation view of the gate portion of the hood used in conjunction with the invention.

Working area 51 contains a controlled atmospheric pressure when a laser is being used as the heat source. The entrance and exit ports of enclosure 50 are opened and closed by means of mechanically operated gates 52, for example, which are shown in detail in FIG. 9 which are present to protect against the escape of any deflected laser beam or part thereof which could harm the operator or other nearby worker. Conventional gas sealing means 41a are provided to diminish any air leakage so that the desired air pressure (for example 20–40 p.s.i.) can be maintained during bubble collapse. As an example, in FIG. 9, a common type of gasket 41a lines the perimeter on the inner surface of gate 52 to form the sealing engagement with enclosure 50. Having the sealing means 41a on the inner surface of the gate enables the higher pressure within the chamber to assist in forcing gasket 41a into sealing relationship with enclosure 50. Similar gates are provided at both the entrance end and the exit end of enclosure 50.

The gates are reciprocally movable and are driven by means of drive means 53 through interengagement of rack and pinion assembly 54. Microswitches 55 and 56 are employed to halt the reciprocal movement of gate 52 when it is in the closed and opened position respectively. Contact with microswitches 55 and 56 is made by means of arm 57 extending from gate 52. The control of reversible drive means 53 is connected so as to be controlled by the operator performing the constriction operation. A common type of reversible motor is satisfactory for use as drive means 53.

In actual operation, the thermometer is positioned in thermometer holding means 41 and is transported by means of conveyor 40. It enters enclosure 50 through access gate 52. There are openings 52a in gates 52 to permit the passage of conveyor 40. To insure proper location of thermometer blank 20 within working area 51, enclosure 50 is provided with two parallel spaced supports 60 and 61 which are also parallel to conveyor 40 and rectangular base 42. Each support 60 and 61 has a longitudinal channel 62 and 63 extending the length of the portion. The outer portions of base 42 slidably travel in channels 62 and 63 which form a track therefor. This maintains thermometer blank 20 in the proper position with respect to the laser while holding means 41 is within enclosure 50.

This particular type of tracking mechanism is merely representative of many different types which may be employed.

Figure 8:
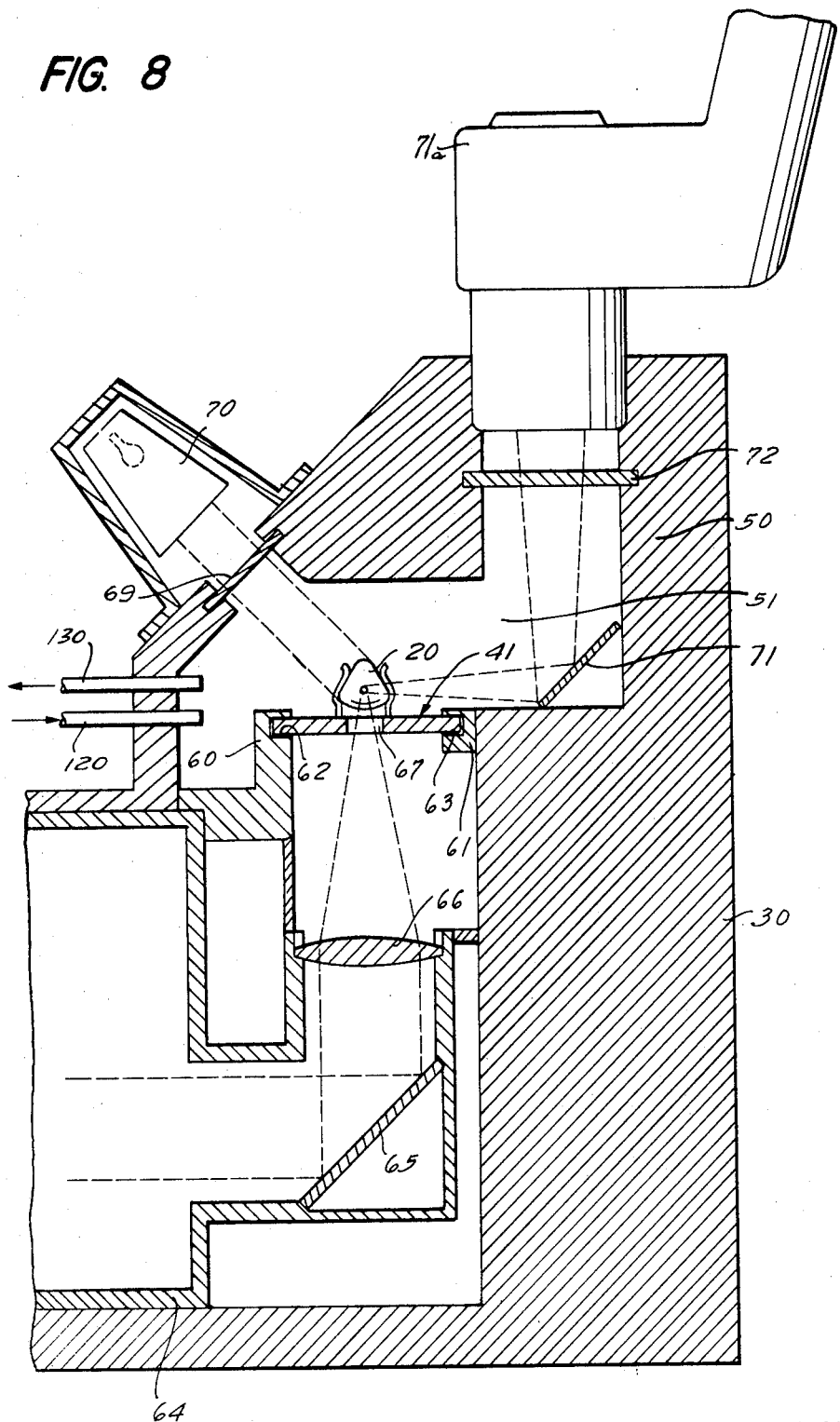
FIG. 8 is a fragmentary sectional elevation view of the apparatus of the invention with a laser being used as a heat source and dotted lines showing the path of travel of the laser beam and the beam of illuminating light.

The controls of conveyor 40 are programmed by any common means, so that thermometer blank 20 and holding means 41 come to a stop in alignment with the laser 64 used to collapse the bubble as shown in FIG. 8. Laser 64 is arranged, as depicted in FIG. 8, so that the laser beam is deflected upward by deflector 65 and focused by lens 66 on the back of the thermometer in line with the bubble of blank 20. An opening 67 is provided in base 42 to permit the laser beam to impinge upon thermometer blank 20.

There are many different types of lasers which are acceptable for this type of operation with the major criteria being that the laser beam must be able to enter the glass and be substantially absorbed thereby to heat the glass. Also, the laser must not have any adverse effects on the glass or the mercury therein which would affect the use of the blank as a finished commercial thermometer. An example of one which has been found to be acceptable is a $CO_2$ laser producing a 10.6 micron inra-red light, such as the one manufactured by Perkin-Elmer Corporation of Norwalk, Conn. and designated as model 6200.

This type of laser energy will enter the glass and is substantially absorbed, thereby heating and softening the glass. Therefore, since substantially all of the laser beam must pass through focusing lens 66, and impinge on thermometer blank 20, that lens is not made of glass. There are many substances common to the laser art which may be used as focal lens 66, an example of which is "Irtran 2" manufactured by Eastman Chemical Products, Inc. in Kingsport, Tenn., and which is primarily zinc sulfide.

It is well known in the art that all portions of a beam from a laser will remain very nearly parallel over extremely long travel distances and will not spread rapidly as ordinary light will do. Therefore, since a laser beam is so nearly parallel, it is easily controllable and focused at a particular point. In operation, it is particularly advantageous to have the bubble portion of the thermometer blank 20 be contacted by the laser beam either slightly before or slightly after the focal point of the laser beam to reduce the heating per unit area to prevent boiling and bubbling the glass at the back surface while at the same time producing a large heating effect which will quickly penetrate to soften the glass forming the constriction bubble, in order to collapse it.

If an operator fails to put a thermometer in the carrier 41, the laser beam (see FIG. 8) will continue upward and be absorbed by a shield, if desired, or by the enclosure itself. Because the laser beam will be so spread out at the shield or where it contacts enclosure 50 any ordinary metal such as steel or ceramic material will be fully adequate to absorb the beam.

A portion of enclosure 50 is transparent to ordinary visible light but preferably not to the laser light being used, such as portion 69 to allow passage of additional illumination to contact the thermometer thereby making it easier for the operator to view the constriction formation. A common type of illuminating source is used such as light 70 shown in FIG. 8. In order to protect against and possibility of reflected laser light escaping in the area of light 70 a shield 69 is positioned so as to enclose light 70. Shield 69 may be of similar material as enclosure 50 and may be fastened to enclosure 50 or may be a permanent part of the enclosure.

As a further aid in observing the formation of the constriction, a magnifying means is employed for use by the operator. In FIG. 8, a binocular type of microscope 71a is shown in position to receive an image from thermometer blank 20. Light 70 is positioned so that a portion of its rays will illuminate thermometer blank 20 and its image will be reflected by front surface mirror 71 up into binocular microscope 71a for viewing. In this manner, the operator can more closely observe and control the collapsing of the bubble within thermometer blank 20. An optional filter 72 opaque to the laser energy used but transparent to the light of light source 70 is provided to render it completely safe to view the reflected image. All of the controls of this system just described and as shown in FIG. 8 are connected to a central control panel, not shown, for the convenience of the operator so that he may open access gates 52, activate conveyor 40 to position a thermometer in alignment with the laser, close the access gates 52, pressurize the work region 51, (as will be more fully discussed later), activate the laser, view the formation of the constriction, deactivate the laser and speedily depressurize the work region 51 when the proper size constriction is formed and open the access gates to allow the thermometer with a constriction to be removed and another thermometer to be properly positioned by means of the conveyor. The controls may be activated by hand switches or foot controls, or both, and the operator neeed not ever touch a thermometer except for loading by another operator and unloading can be automatic during the entire constriction forming operation.

Should it be desirable to use a common type of gas burner to heat and collapse the bubble in thermometer blank 20 instead of a more costly laser and still obtain a more controlled bubble collapse, chamber 110 (see FIG. 10) is provided having a controlled internal atmospheric pressure.

A sealed enclosure 110 having an internal chamber 111 in which the atmospheric pressure may be controlled is provided and is similar in configuration to the enclosure and chamber shown in FIG. 8. Chamber 111 is large enough to receive a thermometer blank 20 and whatever holding means for thermometer 20 is employed. A holding means such as platform 42 and clips 43 shown in FIG. 5 may be used, for example. Enclosure 110 consists of two parts which permit entrance and exit of thermometer blank 20. The operation of the entrance and exit means may be similar to that shown in connection with FIG. 8 and similar type of gates may be employed.

It should be emphasized that all of the connecting portions of enclosure 110 should be sealingly engaged. All of the remaining parts of enclosure 110 and those associated therewith may be similar to those shown and described in connection with the embodiment of FIG. 8, with the exception of laser 64 and its means of connection.

Instead a gas burner 81 is positioned within chamber 111 so that when thermometer blank 20 is positioned within 111 the bubble 23 will be in alignment with flame 82 of gas burner 81. In this position the flame 82 will heat the thermometer at this point causing bubble 23 to collapse and form a constriction.

To prevent flame 82 of burner 81 from reaching thermometer blank 20, a remotely controlled electromagnetic flag 83 is provided. Flag 83 is connected to arm 84 which is pivotally mounted at its other end 85. Two stops 86 limit the movement of arm 84 and consequently flag 83 so that in each extremity of its movement it will rest in an open and closed position respectively. A spring 87 biases arm 84 in one direction and a remotely controlled solenoid 88 which, when activated, will move arm 84 and flag 83 to its other extremity is connected thereto. A pressure switch 89 is connected to solenoid 88 and an electrical source and is positioned in the vicinity of the operating position so that the operator may open and close flag 83 as he desires to begin and end the heating process.

A compresed air supply 90 is connected to a pressure regulator 92, which in turn is connected to a hand operated on-off valve 93, which is connected to conduit 91, which is connected to the interior of chamber 111.

A combustible gas supply 94 is connected through pressure regulator 96 and conduit means 95 to gas burner 81. This gas supply is preferably substantially higher than the pressure to be used within enclosure 110. For example, either tank gas or a gas compressor can be used for this application. A common type of pressure regulator may be used and the side of the diaphragm which is usually connected to atmospheric air is instead enclosed and connected to the atmosphere within chamber 111 near thermometer blank 20 by means of conduit 97.

Either air or oxygen may be used as the oxidizer for the combustible gas and such oxidizer gas is supplied from source 98 through pressure regulator 100 and conduit means 99. Preferably, this gas should be provided at a pressure substantially higher than the pressure to be used within chamber 111 enclosing thermometer blank 20. A compressed air line or a tank of compressed gas, for example, can be used as oxidizer source 98. A common type of well known pressure regulator is employed and a connection is also made from the lower pressure side of the diaphragm of regulator 100 into chamber 111 through conduit means 101 and 97.

Naturally the gas burner employed would have to be similar to the usual gas oxygen type burner where both the combustible gas and the oxidizer are piped to it. The size and type of the flame would be regulated by adjusting knobs 102.

In actual operation, thermometer blank 20 is placed in proper position within chamber 111 by the use of a common type of index reference means such as discussed above for the previously discussed embodiment. Chamber 111 is sealed and the proper desired pressure is provided therein. In the initial position, gas flame 82 is prevented from heating thermometer blank 20 because flag 83 is to be in its closed downward position with solenoid 88 being de-energized.

Enclosure 110 is closed and sealed and then the operator depresses both controls 93 and 89. Operation of 93 fills chamber 111 with compressed air or other non-flammable gas to the pressure set by regulator 92, for example, 30 p.s.i.g. Many other pressures may be effectively utilized. The temperature of the flame and the pressure are variable, therefore, if a greater pressure is used, a lower flame temperature or shorter time is needed and visa versa. As the chamber pressure rises, this pressure is communicated along conduit 97 to the atmosphere sides of the pressure regulator diaphragms of pressure regulators 96 and 100. This action immediately raises the fuel gas pressure and the oxidizer pressure flowing out of regulator 96 and regulator 100 through needle valves 102 of the burner 81 and into chamber 111. With this pressure being maintained greater than the chamber pressure, flame 82 is maintained. With regulator 96 and 100 along with needle valves 102 being outside of enclosure 110, the flame 82 can be vernier adjusted by watching it through a transparent portion of enclosure 110 (not shown) while operating at 30 p.s.i.g., or other selected chamber pressure.

Operation of switch 89 energizes solenoid 88 and raises flag 83 out of the way of flame 82. This then heats the back of the constriction portion of thermometer blank 20. The operator watches the magnified projected image of the constriction, through microscope similarly as in the embodiment of FIG. 8, and at the chosen moment releases both controls 93 and 89. It should be noted that a variety of parts common to both the embodiments of FIGS. 8 and 10 are similarly numbered and operate in the same manner to perform the same function.

The sudden drop in chamber pressure provides much improved control in stopping the constriction collapse at the proper moment. This results in a great reduction in "overshoot." In addition, in the embodiment of FIG. 8 directed to the use of a laser, should the constriction be collapsed too far, the pressure could be reduced within chamber 111 to a partial vacuum thereby permitting the bubble to expand slightly to an acceptable size for the constriction. A vacuum conduit 130 would be connected to the interior of chamber 51 and to a source of vacuum to achieve this result. Manual controls (not shown) could be provided for the operator to apply the vacuum when it is desirable.

It should be further noted, that the operator by releasing control 93, would be returning the chamber pressure to one atmosphere and this through conduit 97 would cause regulators 96 and 100 to reduce the gas and oxidizer pressures to normal and thereby maintain flame 82 at normal size.

If it should be desirable, as previously stated, a controlled atmosphere chamber may be used with a laser as the source to collapse the bubble in the thermometer 20. A similar chamber as that shown in FIG. 10 may be used, as shown in FIG. 8 with the exception that no connections needed made to oxidizer and gas sources since the laser 64 replaces gas burner 81. Inlet tube 120 is connected to a source of pressure comparable to 90, with controls comparable to 92 and 93 for rapidly pressurizing and depressurizing chamber 51.

A common type of control means (not shown) will be used to turn on and off the laser beam in conjunction with the operation of the pressure controls for chamber 51, comparable to the methods already described for controlled collapsing of the bubble to form a constriction.

Thus, the above mentioned objects of the invention, among others are achieved. The range and scope of the invention are defined in the following claims.

I claim:

1. Apparatus for forming a constriction in a glass thermometer having a bore with a fluid-free collapsible bubble intermediate its ends comprising support means to hold the thermometer, a heat source positioned in relation to said support so that the heat from said source impinges primarily on one side of said thermometer and heats the glass to soften it and to permit partial collapse of the bubble therein, a sealed enclosure having a controlled pressure chamber therein, three dimensional viewing means in position with respect to said support to be directed at the location where a constriction in a thermometer is to be formed, and access means for enclosing said thermometer in said chamber before the heat source impinges thereon so that when the thermometer is being heated a larger pressure is maintained in said chamber and when the bubble has been sufficiently collapsed and the heat source is disassociated with said thermometer a smaller pressure is provided in said chamber thereby facilitating the stopping of collapse of said bubble to form the constriction in the thermometer.

2. The invention in accordance with claim 1 wherein said heat source is a laser of the type which will heat the glass of the thermometer.

3. A method of forming a constriction in a glass thermometer blank having a bore with a fluid-free collapsible bubble intermediate its ends by using a heat source within a controlled atmospheric chamber in an enclosure comprising; placing said thermometer in said chamber, sealing said chamber, providing the desired pressure within said chamber to apply external pressure to the blank, bringing the blank and the heat source into alignment within said chamber so that the heat from said heat source impinges on and heats the glass blank to soften it and permit partial collapse of the bubble therein, stopping the impingement and heating of said blank by said heat source after the bubble has been collapsed sufficiently to form a proper constriction and substantially reducing the pressure in said chamber to facilitate the stopping of the bubble collapse at the proper time to obtain the desired configuration.

4. The invention in accordance with claim 3 wherein said heat source is an infrared laser.

5. The invention in accordance with claim 3 wherein the desired atmosphere within said sealed chamber is provided by connecting a compressed air supply to said enclosure in communication with said chamber and activating said compressed air supply to provide a predetermined pressure within said chamber.

6. Apparatus for forming a constriction in a thermometer having a bore with a collapsible bubble intermediate its ends including means for enclosing the thermometer in a housing and substantially changing the pressure of the atmosphere within the housing, flame producing means within the housing and control means adapted to controllably direct the flame upon said thermometer, means for suddenly changing the pressure of the enclosed atmosphere, and means for automatically maintaining the flame despite major changes of the atmosphere pressure surrounding the flame within the housing.

7. A method of forming a constriction in a thermometer blank having a bore with a collapsible bubble intermediate its ends including the steps of positioning the thermometer in holding means within an enclosed housing, providing an atmosphere within the housing substantially greater than normal atmospheric pressure, providing a flame heat source controllably directable at a side portion of said bubble, directing the flame upon said bubble until the bubble collapses to a predetermined degree, then directing the flame away from the bubble, substantially and suddenly dropping the atmospheric pressure within the enclosed housing, and continuously sensing the atmospheric pressure within the housing and automatically altering the supply pressures of the fuel gas and oxidizer gas of the flame to maintain the flame despite wide variation of the atmospheric pressure within the housing including condition when the housing is open for removing the previous thermometer and positioning the next one.

8. Apparatus for forming a constriction in a glass thermometer having a bore with a fluid-free collapsible bubble intermediate its ends comprising support means to hold the thermometer, a heat source positioned in relation to said support so that the heat from said source impinges on said thermometer and heats the glass to soften it and to permit partial collapse of the bubble therein, a sealed enclosure having a controlled pressure chamber therein and access means for enclosing said thermometer in said chamber before the source impinges thereon so that when the thermometer is being heated a larger pressure is maintained in said chamber and when the bubble has been sufficiently collapsed and the heat source is disassociated with said thermometer a smaller pressure is provided in said chamber thereby facilitating the stopping of collapse of said bubble to form the constriction in the thermometer, said heat source including a gas burner within said chamber, said gas burner being connected within said chamber to a fuel gas source and an oxidizer source thereby enabling the combustion of the gas from said gas source within said chamber so that a gas flame will be produced to impinge upon said thermometer.

9. Apparatus for forming a constriction in a glass thermometer having a bore with a fluid-free collapsible bubble intermediate its ends comprising support means to hold the thermometer, a heat source positioned in relation to said support so that the heat from said source impinges on said thermometer and heats the glass to soften it and to permit partial collapse of the bubble therein, a sealed enclosure having a controlled pressure chamber therein and access means for enclosing said thermometer in said chamber before the source impinges thereon so that when the thermometer is being heated a larger pressure is maintained in said chamber and when the bubble has been sufficiently collapsed and the heat source is disassociated with said thermometer a smaller pressure is provided in said chamber thereby facilitating the stopping of collapse of said bubble to form the constriction in the thermometer, said heat source including a gas burner within said chamber, said gas burner being connected within said chamber to a fuel gas source and an oxidizer source thereby enabling the combustion of the gas from said gas source within said chamber so that a gas flame will be produced to impinge upon said thermometer, a flag movably mounted within said chamber in alignment with said gas flame and said thermometer and positioned so that when it is in an initial position it will be between the gas flame and the thermometer so as to prevent the heating thereof and when it is moved to a second position it will permit said gas flame to heat said thermometer, and flag control means outside of said chamber connected to said flag within said chamber to control the movement thereof.

10. Apparatus for forming a constriction in a glass thermometer having a bore with a fluid free collapsible bubble intermediate its ends comprising support means to hold the thermometer, a heat source positioned in relation to said support so that the heat from said source impinges primarily on one side of said thermometer and heats the glass to soften it and to permit partial collapse of the bubble therein, a sealed enclosure having a controlled pressure chamber therein and access means for enclosing said thermometer in said chamber before the heat source impinges thereon so that when the thermometer is being heated a larger pressure is maintained in said chamber and when the bubble has been sufficiently collapsed and the heat source is disassociated with said thermometer a smaller pressure is provided in said chamber thereby facilitating the stopping of collapse of said bubble to form the constriction in the thermometer, and said heat source being a carbon dioxide-type laser.

References Cited

UNITED STATES PATENTS

| | | | |
|---|---|---|---|
| 2,622,779 | 12/1952 | Smith et al. | 65—110X |
| 3,460,390 | 8/1969 | Blackman | 65—56X |

ARTHUR D. KELLOGG, Primary Examiner

U.S. Cl. X.R.

65—32, 285